United States Patent [19]

Zeilon

[11] Patent Number: 4,915,792

[45] Date of Patent: Apr. 10, 1990

[54] PROCESS FOR SEPARATING A VOLATILE COMPONENT FROM A MIXTURE

[76] Inventor: Sten Zeilon, Heimdalsgaten 21, S-26162 Glumslöv, Sweden

[21] Appl. No.: 259,266

[22] PCT Filed: Feb. 8, 1988

[86] PCT No.: PCT/SE88/00041

§ 371 Date: Oct. 11, 1988

§ 102(e) Date: Oct. 11, 1988

[87] PCT Pub. No.: WO88/06054

PCT Pub. Date: Aug. 25, 1988

[30] Foreign Application Priority Data

Feb. 11, 1987 [SE] Sweden .............. 8700553-4

[51] Int. Cl.⁴ ............................. B01D 3/00
[52] U.S. Cl. ........................ 203/22; 62/119; 159/47.1; 159/901; 159/DIG. 33; 203/27; 203/49; 203/86; 203/98; 203/DIG. 4; 203/DIG. 8; 203/DIG. 9
[58] Field of Search ............ 203/49, 27, DIG. 9, 203/DIG. 4, 22, 86, 98, DIG. 8; 159/DIG. 33, 901, DIG. 27, DIG. 28, 47.1; 62/119

[56] References Cited

U.S. PATENT DOCUMENTS

| | | | |
|---|---|---|---|
| 1,261,005 | 4/1913 | Barstow et al. | 202/170 |
| 3,345,272 | 10/1967 | Collins | 203/49 |
| 3,522,151 | 7/1970 | Dismore | 203/49 |
| 3,563,860 | 2/1971 | Henderyckx | 159/DIG. 28 |
| 3,637,465 | 1/1972 | Wilson | 203/DIG. 4 |
| 3,833,479 | 9/1974 | Fredricksson | 203/49 |
| 3,860,492 | 1/1975 | Lowi, Jr. et al. | 202/236 |
| 3,977,204 | 8/1976 | Bourne | 62/112 |
| 4,478,686 | 10/1984 | Barth et al. | 203/49 |
| 4,506,524 | 3/1985 | Schlichtig | 62/112 |
| 4,626,321 | 12/1986 | Grethlein et al. | 203/DIG. 4 |
| 4,728,397 | 3/1988 | Kjellander et al. | 203/10 |
| 4,754,805 | 7/1988 | Rothmeyer | 62/112 |

FOREIGN PATENT DOCUMENTS

| | | | |
|---|---|---|---|
| 378762 | 9/1985 | Austria . | |
| 2326454 | 12/1974 | Fed. Rep. of Germany . | |
| 2459935 | 7/1976 | Fed. Rep. of Germany . | |
| 2600398 | 7/1977 | Fed. Rep. of Germany ... | 203/DIG. 4 |
| 3435614 | 4/1986 | Fed. Rep. of Germany . | |
| 1296089 | 5/1962 | France | 203/49 |
| 2322101 | 2/1977 | France | 203/DIG. 4 |
| 2471799 | 6/1981 | France . | |
| 59-6882 | 1/1984 | Japan . | |
| 0009202 | 3/1984 | Japan | 203/DIG. 4 |
| 2010104 | 6/1979 | United Kingdom | 203/DIG. 4 |

*Primary Examiner*—Virginia Manoharan
*Attorney, Agent, or Firm*—Laurence R. Brown; Alfred J. Mangels

[57] ABSTRACT

A volatile component is separated from a mixture by vaporization in an evaporator and condensation in a condenser. The vapor is transported by a carrier gas that is circulated in and between the evaporator and the condenser. A flow of a liquid is circulated in subsequent heat transfer steps from contact with the mixture via a cooler, via contact with the carrier gas in the condenser, via a heater, and back to contact with the mixture.

9 Claims, 7 Drawing Sheets

PROCESS FOR SEPARATING A VOLATILE COMPONENT FROM A MIXTURE

BACKGROUND OF THE INVENTION

1. Field of the Invention

The present invention refers to a method of separating a volatile component from a mixture in which said volatile component is incorporated, said method comprising circulating a flow of a carrier gas from an evaporator to a condenser and back to said evaporator, said carrier gas being supplied to the evaporator to contact said mixture and subsequently being transferred to the condenser together with the volatile component of the mixture, a part of said volatile component being precipitated by condensation in said condenser.

2. Description of the Related Art

As examples of processes, where a volatile component of a mixture is a desired product, may be mentioned ethanol distilled out of an ethanol/water solution, and water distilled out of salt water. As other examples of processes, where a lowered fraction of the volatile component is desired, may be mentioned concentrations of solutions and drying of moist material. The invention is thus applicable to a wide span of distillation and drying processes.

The use of a carrier gas as a transport medium for vapor from an evaporator to a condenser has been demonstrated in the German patent application 2 459 935 in reference to distillation of water. Thus a spray of heated salt water is in an evaporator evaporatively cooled by a flow of a carrier gas, said gas being subsequently propelled in a condenser in heat exchange with the flow of salt water, preheating the same under precipitation of condensate. The amount of available heat of vaporization is in the process very limited, namely to the sensible heat in the spray drops and consequently the obtainable evaporation rate of the spray drops is small.

SUMMARY OF THE INVENTION

A remarkably improved process efficiency is according to the invention obtained by the introduction of a separate heating agent in the form of a circulated liquid flow, transferring to the mixture any desired amount of heat of vaporization and being a total enthalpy sink for condensate.

A separation process may thus be carried out with high energy efficiency at any desired pressure level or at any desired temperature range below the boiling point of the volatile component, which constitutes a prime object of the invention.

Especially, pressure level may be chosen equal to atmospheric pressure, which constitutes a second object.

Temperature range for a separation process may further be chosen to prevent deterioration in quality of heat sensitive mixtures or to permit use of a heat transfer surface made out of plastics, which is a third object of the invention.

These objects and others, listed below, are obtained by a method further characterized in that a flow of a liquid is circulated from heat transfer contact with said mixture, via heat transfer contact with an external heat sink in a cooler, via heat transfer contact with said carrier gas in said condenser, via heat transfer contact to an external heat source in a heater and back with said heat transfer contact with said mixture.

A further object is a simplified and highly efficient condensation surface by the use of the volatile component as the heat transporting liquid.

Another further object is to conduct a separation process over a wide temperature range with improved energy efficiency.

Another object is to provide a separation process, well adapted to be driven by a liquid/liquid heat pump for further improved energy efficiency.

BRIEF DESCRIPTION OF THE DRAWINGS

The invention will be described in more detail below in referance to the drawings. The basic principle of the method is illustrated in FIG. 1 in a temperature and enthalpy diagram and in FIG. 2 in an apparatus section. The method extended over a widened temperature range is illustrated in FIG. 3 in a temperature/enthalpy diagram and in FIG. 4 in an apparatus section.

FIG. 5 shows in a plan section direct heat transfer through membranes to a fluent mixture. FIG. 6 shows in a vertical cross section and FIG. 7 in a longitudinal section another mode of direct heat transfer through tube walls to a fluent mixture. This mode is further illustrated in FIG. 8 by a section of an apparatus for distillation of a fluent mixture.

Figure 10:
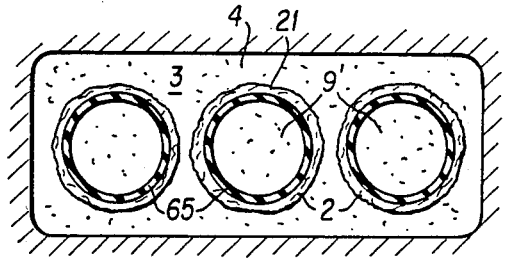
Figure 11:
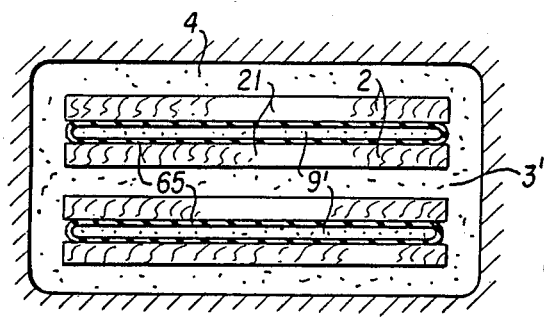
Figure 9:
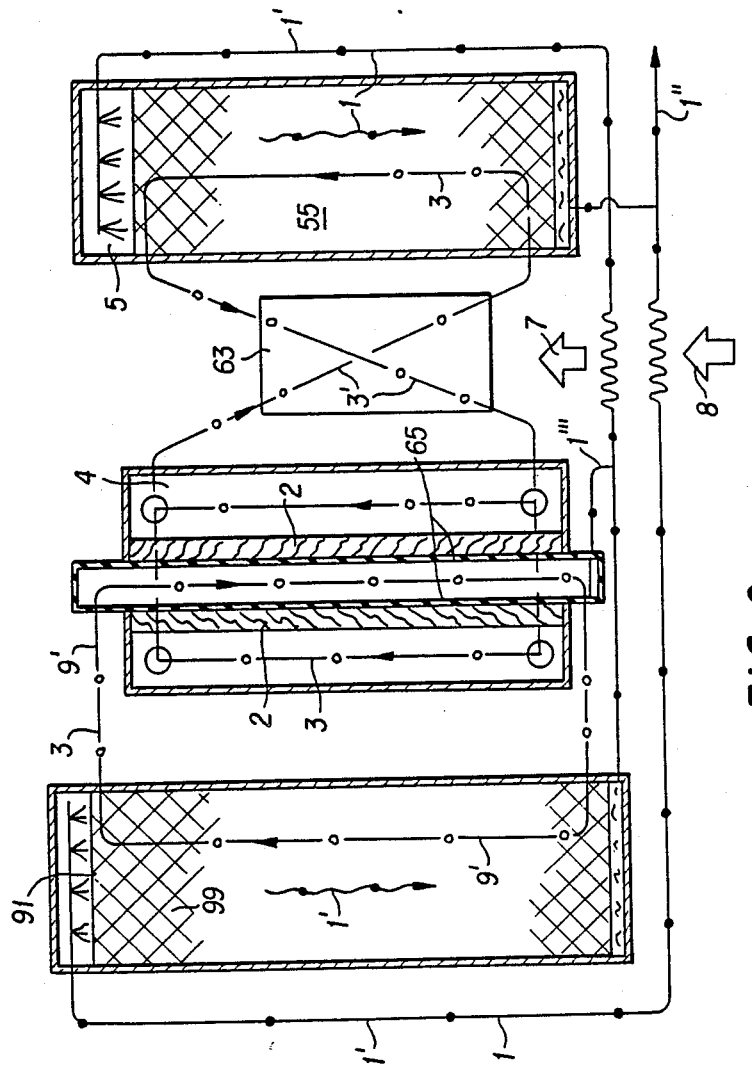

An indirect method of heat transfer to fluent or solid mixture by means of a vapor saturated carrier gas is illustrated in FIG. 9 in an apparatus section and in FIGS. 10 and 11 in detail sections thereof.

Figure 12:
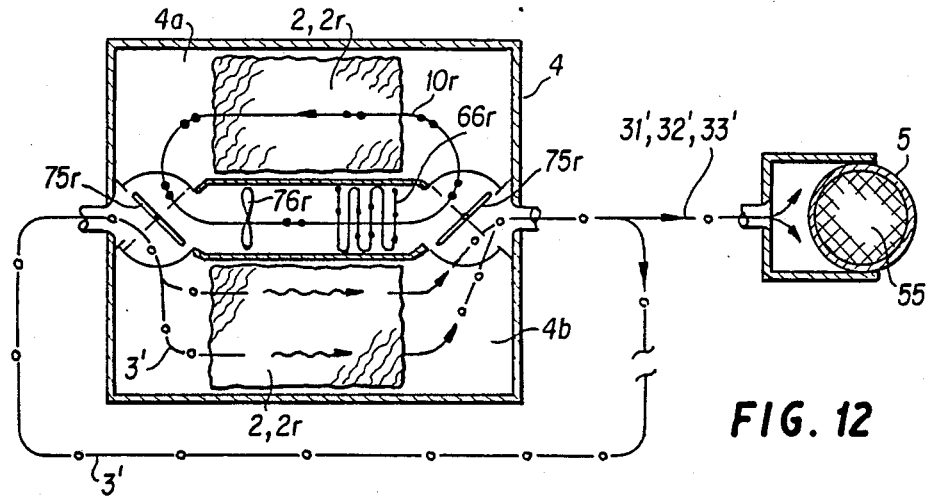
Figure 13:
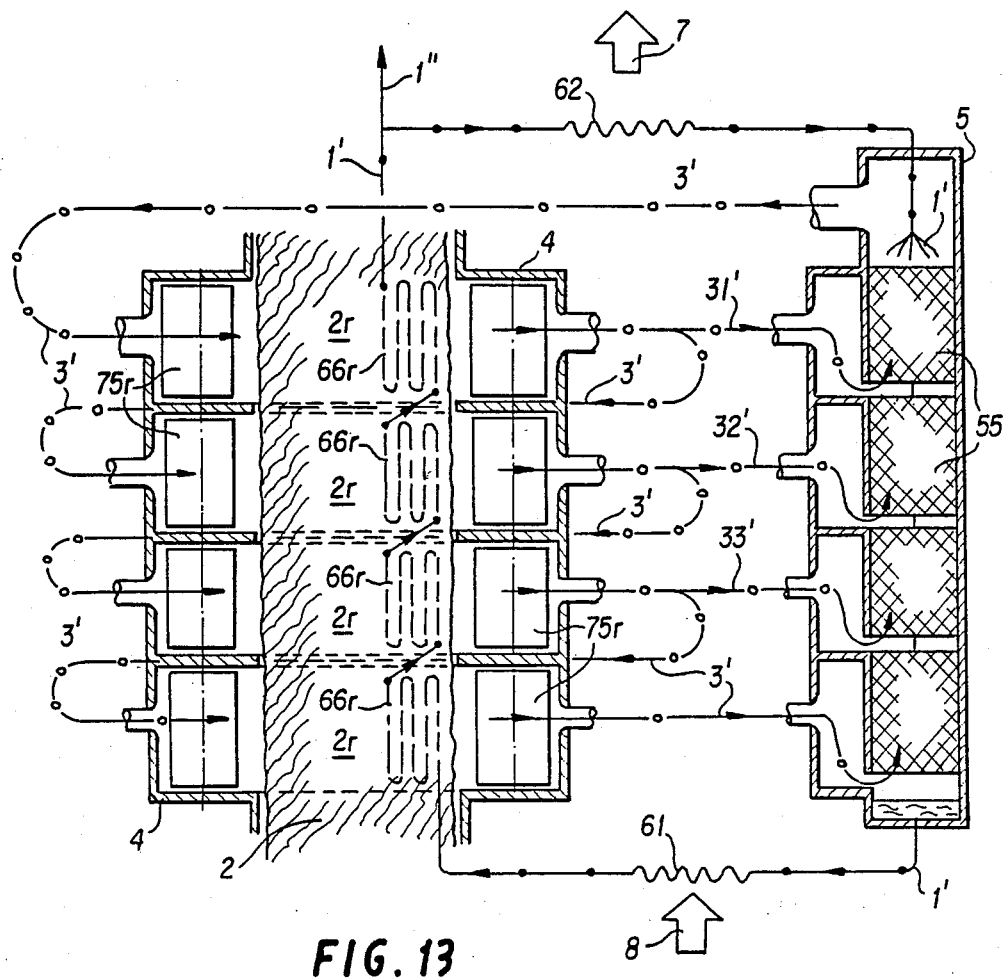

Another mode of indirect heat transfer to a granulated, solid mixture by means of intermittently circulated heating flows of gas is illustrated in apparatus cross sections in FIGS. 12 and 13.

DESCRIPTION OF THE PREFERRED EMBODIMENTS

Figure 1:
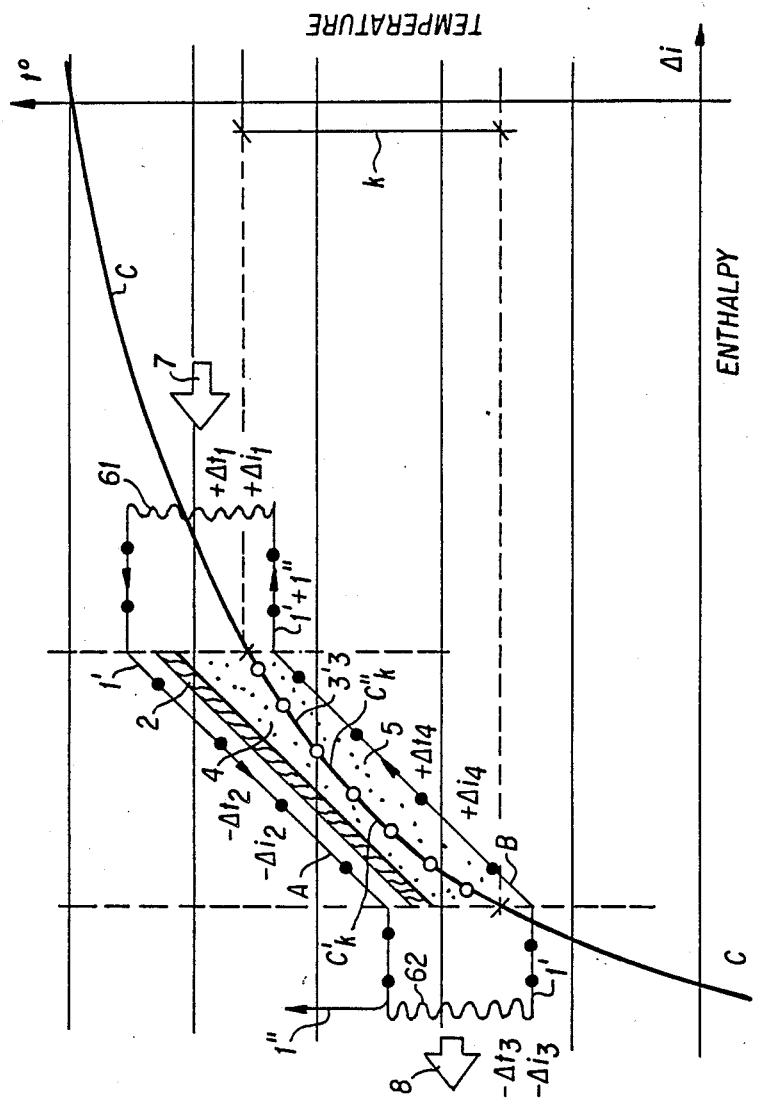
Figure 2:
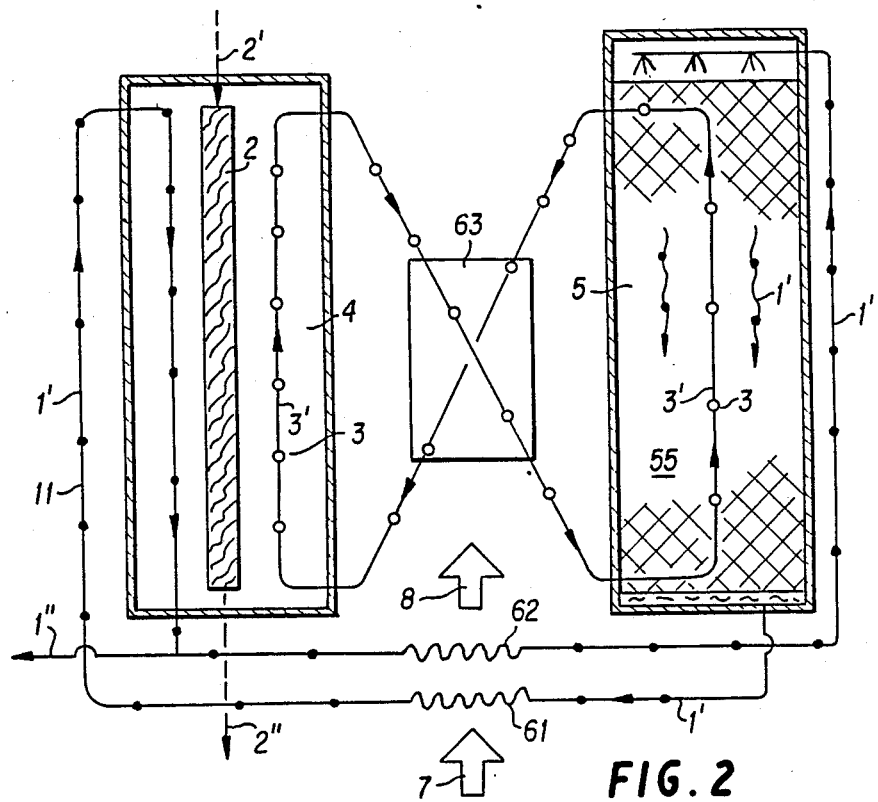

Referring to FIGS. 1 and 2, a flow 3' of an inert carrier gas 3 is propelled along an elongated evaporator 4 in evaporative transfer contact with a mixture 2, spread out in the evaporator 4. From the cool inlet end to the hot outlet end of the evaporator the gas flow 3' undergoes a temperature rise $+\Delta t_2$ and an enthalpy gain $+\Delta i_2$, the latter being mainly composed of the latent heat of a flow of a volatile component 1 of the mixture 2, dissipated in vapor form 1'' from the mixture. Heat of vaporization may to a small extent be supplied by sensible heat in the mixture, but is essentially transferred to the mixture 2 from a flow 1' of a liquid 11. Heat may in direct or indirect manners, as described below, be transferred to from the mixture 2 in a countercurrent mode to the flow direction of carrier gas 3, the liquid undergoing a corresponding enthalpy loss $-\Delta i_2$ and an essentially equal temperature drop $-\Delta t_2$.

In a temperature/enthalpy diagram, according to FIG. 1 the state of the carrier gas 3 is described by a curve $C_k'$, representing a portion "k" of a curve C, that denotes enthalpy of carrier gas, saturated with vapor of the volatile component 1. The corresponding state of the liquid 11 is in the diagram described by a straight line "A", enthalpy and temperature being proportional.

A reversed process takes place in a condenser 5, where the liquid flow 1' and the carrier gas flow 3', both flows being transferred from the evaporator 4, are propelled in countercurrent enthalpy transfer to each other. In the diagram, FIG. 1, the state of the carrier gas in condenser 5 is described by a curve $C_k''$, the gas changing in temperature $-\Delta t_4$ and in enthalpy $-\Delta i_4$ under precipitation of said flow 1" of condensed volatile component 1. Conversely, the liquid 11 undergoes essentially a temperature rise $+\Delta t_4$ and an enthalpy gain $+\Delta i_4$, and the state of the liquid in the condenser is in the diagram described by a straight line "B". For working conditions with the carrier gas 3 fully saturated with vapor of the volatile component 1, the curves $C_k'$ and $C_k''$ are identical.

Preferably volatile component 1 is chosen for said liquid 11. Thus condensation may in known manner be processed as direct wet enthalpy transfer and condensation between the carrier gas 3 and the liquid 11, the latter being spread over a contact body 55, distributed in a vertically elongated condenser 5. As follows, the liquid flow 1' is enriched by precipitating, said flow 1" in the condenser. The latter flow is continously bled off, preferably from the cool end of the condenser 5 or evaporator 4. The straight lines "A" and "B" must in the diagram, FIG. 1, obviously enclose the curved lines $C_k'$ and $C_k''$, together with the necessary allowance of heat gradient needed for the described heat and vapor transfers. A closed process circuit and a driving force for the process is thus obtained by a cooling step in a cooler 62, where the liquid 11, being transferred from "A" to "B", is cooled against an external heat sink 8, changing in temperature $-\Delta t_3$ and in enthalpy $-\Delta i_3$. In a heating step, the liquid 11 being transferred from "B" to "A", the liquid 11 is heated in a heater 61 from an external heat source 7, the liquid changing in temperature $+\Delta t_1$ and in enthalpy $+\Delta t_i$.

A driving force for the separation process is a heat amount $\Delta i_1$, approximately equal to $\Delta i_3$, being reduced in temperature level from a heat source 7 to a heat sink 8. An essential element of the invention is that the driving force may be essentially smaller than the enthalpy amounts $\Delta i_2 \cong \Delta i_4$ engaged in the actual process of separation of a volatile component 1 from a mixture 2 in the evaporator 4 and condensing the same in the condenser 5. Thus a first energy efficiency factor $e_1 = \Delta i_2/\Delta i_1$ is defined. Obviously said factor is improved by extending a temperature range "k" of the process and by narrowing of the temperature gap between the straight lines "A" and "B". The latter is accomplished by using large and efficient transfer surface for heat and vapor. Since the temperature range "k" may be chosen at will below the boiling point of the volatile component 1, temperature conditions may be chosen to suit a heat sensitive mixture 2 or to permit the use of plastics for cheap, efficient and noncorrosive evaporator and condenser transfer surfaces. Further, the described condensation process over a wetted contact body 55 may be highly effective. Using a temperature range $k = 15°$, a first efficiency factor $e_1 = 2$ may be obtained.

A second energy efficiency factor $e_2$ may further be obtained by a coupling of the external heat sink 8 and heat source 7 with a heat pump process. This may be done very favorably, using the fairly clean, distilled volatile component 1 as a heating/cooling agent. The temperature range for a heat pump is in the mentioned range $k = 15°$ also favorable and a heat factor $e_2 \cong 5$ may be obtained. A total energy efficiency $= e_1 \times e_2 \cong 10$ will result.

Gas pressure may be chosen at will, but atmospheric pressure may be preferred for low apparatus cost. Enclosed carrier gas 3 may also be chosen at will or specifically to suit quality demands of a mixture 2, for example the absence of oxygen. A low molecular weight gas such as helium may be chosen for high diffusion rate for vapor.

In case of high vaporization rate in the evaporator 4 or vapor pressure reducing forces in the mixture 2, the carrier gas 3 may not attain full vapor saturation in the evaporator 4. Process efficiency may in this case be improved by precooling the flow 3' to the dew point before injection of the flow into the condenser by cooling it against the cooled flow 3', ejected from the condenser, in a heat exchanger 63.

In FIG. 2 is illustrated the method in an apparatus section showing carrier gas 3 propelled in a circuit in and between an evaporator 4, a condenser 5 and a heat exchanger 63, and a liquid flow 1' propelled in subsequent heat transfer steps in contact with a mixture 2 in evaporator 4, to a cooler 62, to carrier gas 3 in a condenser, to a heater 61 and back to the evaporator 4.

Figure 3:
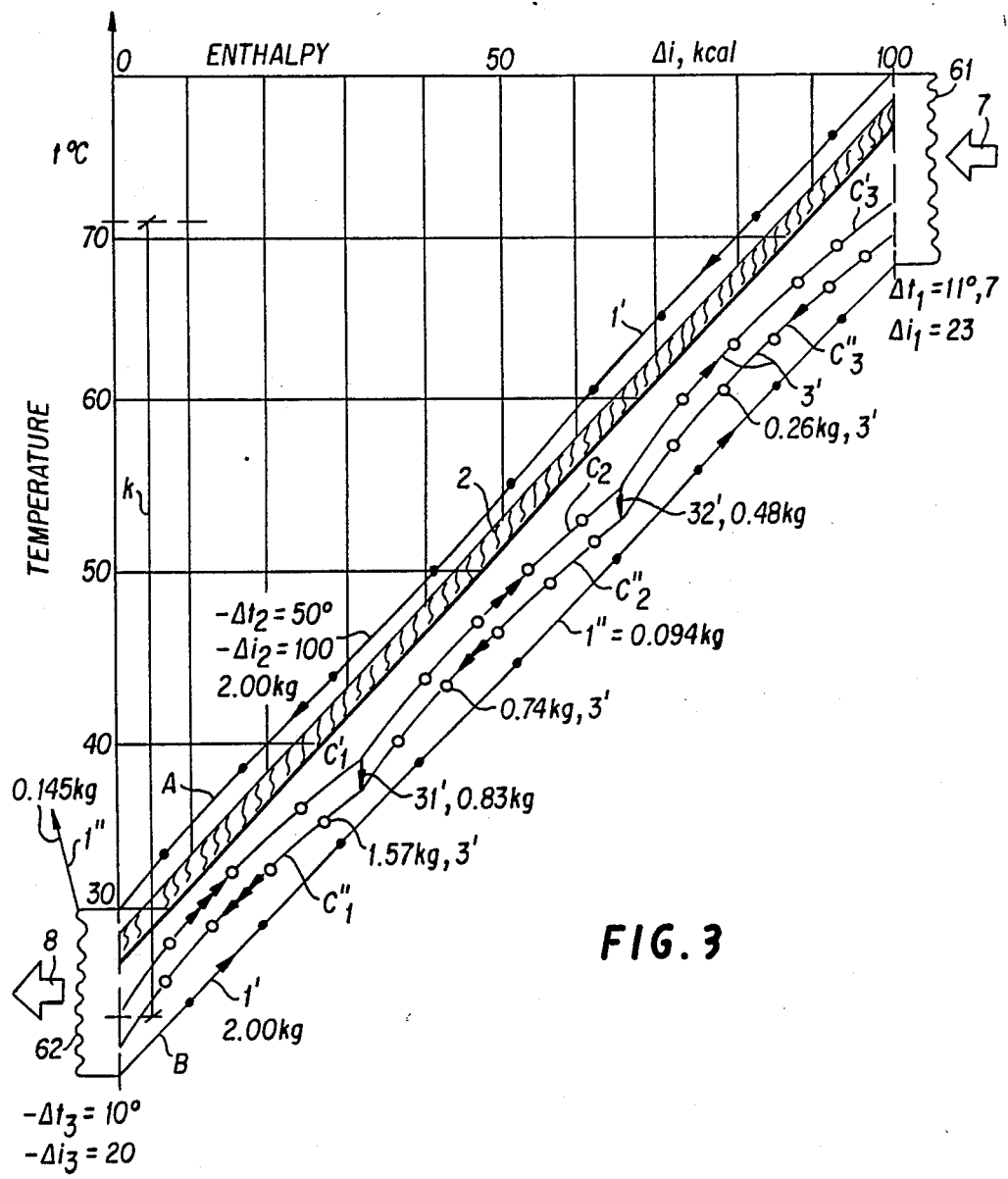

Energy efficiency may be increased significantly by a further inventive step, described below in reference to FIGS. 3 and 4. Thus a number of part flows 31', 32'... are branched off from the mixed flow of carrier gas 3 and volatile component vapor at successive steps along the flow path in the evaporator 4, to be removed with the mixed flow of carrier gas and vapor at succesive steps along the gas flow path in the condenser 5. Further, the temperature range "k" is extended significantly. Utilizing two part flows 31' and 32', FIG. 3 illustrates the evaporator state of the carrier gas 3 as described by three separate curves $C_1'$, $C_2'$ and $C_3'$, representing subsequently diminished mass flows of carrier gas, increased temperature levels and essentially equal transport capacity of vapor. On the other hand, the state of the carrier gas 3 along its flow in the condenser is described by corresponding curves $C_3''$, $C_2''$ and $C_1''$, representing subsequently increased mass flows of carrier gas 3, decreased temperature levels and essentially equal transport capacity of vapor. The state of the liquid flow 1' is described by the straight lines "A" and "B". The described differentiation of mass flow of the carrier gas 3, using an adequate number of part flows, will permit a small temperature gap between the lines "A" and "B" in combination with a wide temperature range "k", resulting in significantly increased first efficiency factor $e_1$ in comparison to previously described method, using a uniform mass flow 3'. A distillation process is exemplified in reference to FIG. 3, with the volatile component 1 being water, the carrier gas 3 being air and the mixture 2 being a water solution to be concentrated. Corresponding mass flows, temperature changes $\Delta t$, and enthalpy changes $\Delta i$ appear from the figure. The driving force is a heat amount $\Delta i_1$ deteriorated from a heat source 7 of approx. $+85°$ C. to a heat sink 8 of approx. $+15°$ C. First energy efficiency factor clculated $e_1 = \Delta i_2/\Delta i_1 = 4,3$.

Heat demand for distillation of 1 kg water amounts to 0,19 kwh, which is another expression of energy efficiency.

The heat transfer between the liquid flow 1' and the mixture 2 may according to the nature of the mixture be arranged in different modes described below in reference to FIGS. 5-13.

Figure 4:
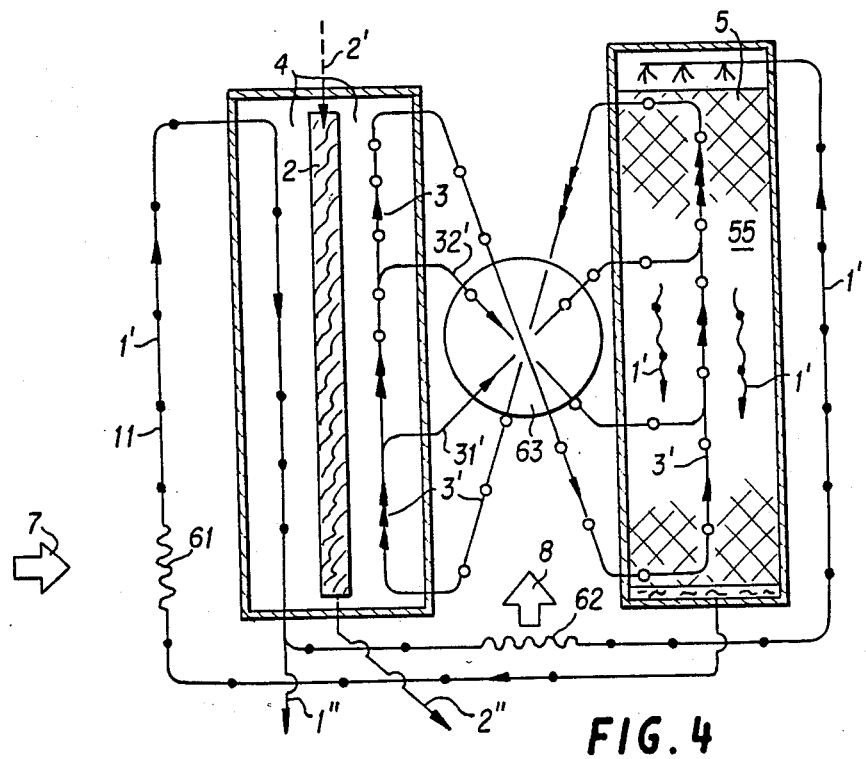
Figure 5:
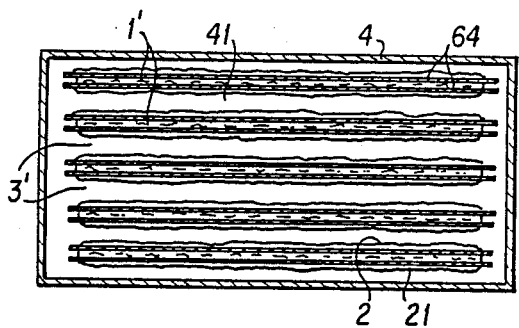
FIGS. 5–13 illustrates the method, utilizing different modes of heat transfer in the evaporator to a mixture. Thus

A direct heat transfer through a membrane is illustrated in FIG. 5, showing a plan section of inside the evaporator 4 vertically mounted pairs of flexible, thin plastic membranes 64. The liquid 11 is propelled in between inner surfaces of the membranes by gravity as thin liquid films, spread over the surfaces by capillary forces. A fluent mixture 2 is propelled as open, falling liquid films 21 along outer surfaces of the membranes in evaporative contact to a carrier gas flow 3', propelled upwards in gas spaces 41. In reference to FIG. 4, a continuous mixture flow 2' of a process fluid may be injected at the top of a vertically extended evaporator, a continous flow 2" of processed fluid being ejected from the bottom of the evaporator. The transfer material 64 is cheap, efficient and noncorrosive and may easily be extended in surface area and height for excellent transfer conditions.

Above described mode has some disadvantage in that the flow speed in the falling liquid films, changing with viscosity, and the retainment time for the liquid in the evaporator, are difficult to regulate.

Figure 6:
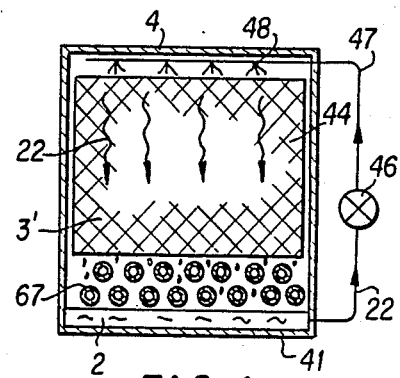
Figure 7:
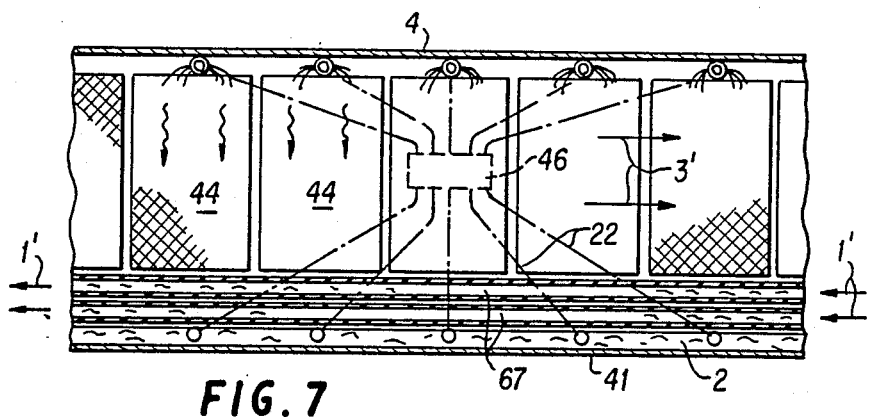

This difficulty is overcome by another mode of direct heat transfer from the liquid 11 to the mixture 2, described below in reference to FIGS. 6–8. According to FIGS. 6 and 7, horizontally elongated evaporator 4 encloses contact bodies 44, horizontal heat transfer tubes 67 for the heating flow 1' and a bottom vessel for a fluent mixture 2. Said flow 3' of carrier gas is propelled in a horizontal flow direction through the contact bodies 44 and along the tubes 67. Substantial part flows 22 of the mixture 2 are circulated vertically through the contact bodies 44, efficiently wetting the same, and over the tubes 67 under reheating. Circulation devices are pumps 46, conduits 47 and spray nozzles 48. The evaporative contact surface between the mixture 2 and the carrier gas 3 may thus be extended at will, independently of the heat transfer surface of the tubes 67, and further be wetted at will by the part flows 22, independently of the actual mass flow of the mixture 2 along the vessel 41 and along the evaporator 4.

Figure 8:
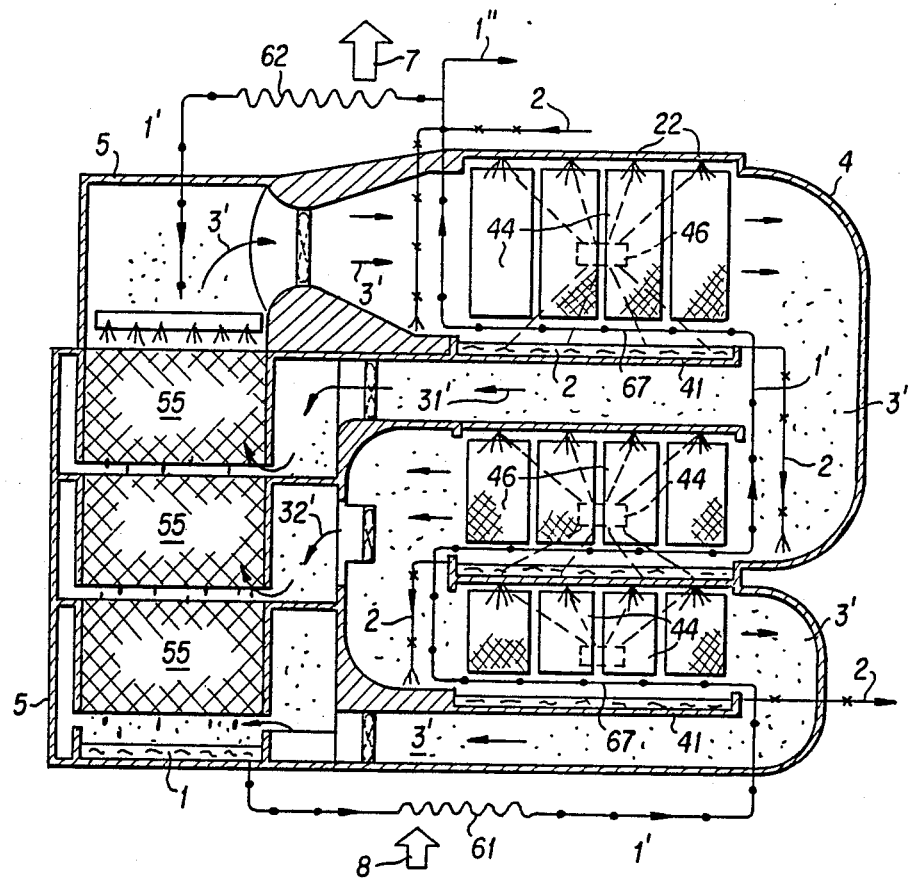

Described mode of heat transfer is further exemplified in an apparatus according to FIG. 8 for distillation of a volatile component 1 out of a fluent mixture 2, in conformance essentially to the apparatus previously described in reference to FIG. 4. The evaporator 4 encloses three separate agglomerates of said contact bodies 44, heat transfer tubes 67 and bottom vessel 41, positioned vertically above each other. Said flow 3' of carrier gas is propelled subsequently through the agglomerates from the cool, top end of the evaporator to the hot, bottom end. Said heater liquid flow 1' is propelled in opposite direction in sequence through the heating tubes 67. Said part flows 31', 32' are branched off from the flow 3' in the evaporator 4 and remerged with the flow 3' in the condenser 5. Said part flows 22 are arranged for wetting contact bodies 44 and tubes 67.

A fluent mixture 2, to be distilled, is propelled by gravity through the vessels 41 in sequence from the cool top end to the hot bottom end of the evaporator. Said precipitated flow 1" of the volatile component is bled off the liquid flow 1', preferably at the cool end of the evaporator.

The mass flow of carrier gas decreases stepwise under its path from cool to hot end in the evaporator. In order to maintain a fair gas velocity for high evaporation the flow area of the contact bodies 44 are correspondingly decreased.

One further object with the illustrated design of the apparatus according to FIG. 8 is to achieve direct and short gas conduits for the part flows 31' and 32'. The apparatus is exemplified with two part flows and three agglomerates. A further differentiation of the mass flow of carrier gas by means of increased number of part flows and agglomerates may easily be achieved within the design pattern, in order to improve thermodynamic efficiency.

An indirect mode of heat transfer to the mixture 2, being spread in the evaporator 4 as fluent or solid layers 21, is illustrated in reference to FIGS. 9–11.

A further flow 9' of the carrier gas 3 is propelled in a closed circuit in evaporative, countercurrent enthalpy transfer along a wetted, further contact body 99 to the heated, liquid flow 1' of the volatile component 1 and subsequently in enthalpy transfer to the mixture layers 21 through the walls of tubes 65. A further flow 1" of volatile component, condensed along the tube walls, is merged with the flow 1'. The tubes 65 are positioned inclined for drainage of condensate. The tubes may be made of flexible plastic material, for example extruded polyethylene hose, and may further be inflated by means of a small pressure difference between the flows 9' and 3'.

FIG. 9, showing a plan section of the evaporator 4, illustrates heat transfer from said flow 9' to a fluent mixture 2, being propelled as open, falling films 21 along the perimeter of vertically extended and inflated tubes 65. FIG. 10, showing another plan section of the evaporator, illustrates heat transfer from said flow 9' to a solid mixture 2, being distributed in the evaporator as parallel layers 21. Flat tubes 65 are inflated against the layers 21 during processing, for example a batch type drying of a moist sheet material 2. The tubes may be deflated under loading or unloading to facilitate positioning of the solid mixture layers 21.

A further method of indirect heat transfer to the mixture 2 is described below in reference to FIGS. 12 and 13. The method refers to a granular and gas penetrable type of mixture. The method may for example be applied for drying moist grain, chopped organic material or lumber. Such a mixture may in known manner be charged intermittently with sensible heat and intermittently be discharged of vapor to a carrier gas contacting the mixture, the heat of vaporization being taken from sensible heat in the mixture. The intermittent heat charging of the mixture is accomplished with gas circulated in a closed circuit through the mixture and a heater.

This procedure may however not allow any high temperature gradient along the path of the heating gas through the moist mixture, due to vapor diffusion from thus a heated, warmer part to a colder part of the mixture bulk. The method of the invention, directly applied to the above mentioned heat transfer procedure, would have a very poor first energy efficiency factor $e_1 < 1$ and thus be useless. However, by splitting a bulk of moist, granular mixture 2 into a number of parts, operated at separate stepwise increased temperature levels, the method described in reference to FIGS. 3 and 4 may be applied.

In reference to FIG. 12, showing an apparatus plan section, an evaporator 4 encloses two separate chambers 4a and 4b, each containing a bulk of granular mixture 2 arranged for gas penetration.

Referring to FIG. 13, showing a corresponding vertical apparatus section, the mixture 2 is in each chamber split into a number of parts $2_r$, as exemplified by four vertically arranged parts $2_r$, index r running upwards from 1 to 4. As shown in FIG. 12, any pair of parts $2_r$ is coupled with a cyclically operated valve device $75_r$, a circulation fan $76_r$ and a part heater $66_r$, by means of which a part flow $10_r$ of gas may be circulated intermittently through either of the parts $2_r$, transferring heat to the same from the part heaters 66$_r$. With the part flows 10$_r$ thus engaged in heating the parts 2$_r$ of one of the chambers 4a or 4b, the carrier gas flow 3' is directed through the mixture 2 of the other chamber.

The flow pattern of the carrier gas 3 appears from FIG. 13. Thus the parts 2$_r$ are penetrated in succesion, index r running from 4 to 1. Three of said part flows of carrier gas 31', 32' and 33' are branched off from the evaporator 4 and remerged with flow of carrier gas in the condenser 5. Said liquid flow 1' is propelled through the heaters 66$_r$ in succesion, index r running from 1 to 4.

The apparatus shown in FIG. 13 is essentially conforming to the apparatus described in reference to FIG. 4, the thermodynamic properties and efficiency being of the same order as described in reference to FIG. 3.

The parts 2$_r$ may be stationary in shown positions during the drying process. They may also be moved continously or discontinously through the apparatus, thus passing different temperature zones under drying.

The apparatus is exemplified in FIG. 13 with vertically arranged parts 2$_r$. The method of the invention may well also be used within an arrangement with the parts 2$_r$ lined up horizontally along a horizontally extended tunnel formed in evaporator 4.

The purpose of the mentioned contact bodies 44, 55 and 99 is to promote efficient contact surface between falling liquid films and said carrier gas 3, propelled through the contact bodies. A suitable contact body may in known manner comprise crosswise positioned layers of corrugated sheet material.

I claim:

1. A method of separating a volatile component (1) from a mixture (2) by using a combination of a carrier gas and a separate flow of liquid each in heat transfer contact with the mixture said method comprising: introducing the mixture into an evaporator (4), circulating a flow (3') of a carrier gas through the evaporator (4) to a condenser (5) and back to said evaporator (4), said carrier gas being supplied to the evaporator (4) to contact said mixture (2) within the evaporator and to receive the volatile component from the mixture and to carry the volatile component from the evaporator, the carrier gas subsequently being transferred to the condenser (5) together with the volatile component (1) of the mixture (2), precipitating a part (1'') of said volatile component (1) by condensation in said condenser, and sequentially circulating a separate flow (1') of a liquid in heat transfer contact with said mixture (2) in the evaporator, then passing the liquid in heat transfer contact with an external heat sink (8) in a cooler (62) to provide a cooled liquid, then passing the cooled liquid from the cooler in heat transfer contact with said carrier gas (3) in said condenser (5), then passing the cooled liquid from the condenser (5) in heat transfer contact with an external heat source (7) in a heater (61) to provide a heated liquid, and then passing the heated liquid from the heater back to said evaporator for heat transfer contact with said mixture (2), wherein the cooled liquid is supplied to said condenser (5) by being applied to contact means (55) in said condenser (5) to provide direct contact with said carrier gas (3), such that the separation of the volatile component (1) from the mixture (2) is achieved at pressure and temperature below the boiling point of the volatile component (1) at an improved energy efficiency.

2. A method according to claim 1 wherein a plurality of part flows of carrier gas (31', 32' . . . ) are branched off from said carrier gas flow (3) in successive steps along the path of carrier gas flow (3') in said evaporator (4) and are remerged at successive steps along the path of said carrier gas flow (3') in said condenser.

3. A method according to claim 2 wherein said mixture (2) is distributed in said evaporator (4) as layers (21) on membranes (64), said separate liquid flow (1') being propelled in heat exchange relationship with one surface of said layers (21) through said membranes (64), another surface of said layers being in evaporative contact with said carrier gas (3).

4. A method according to claim 2 wherein said mixture is propelled along bottom vessels (41) incorporated into said elongated evaporator (4), wherein a plurality of part flows (22) of said mixture (2) are vertically circulated from said vessels (41) over and through contact means (44) within said evaporator (4), to contact said carrier gas propelled through said contact means (44), wherein said plurality of said part flows (22) further are brought into heat transfer contact with said liquid flow (1') through walls of heater tubes (67) and further back to said vessels (41).

5. A method according to claim 2 in which said mixture (2) is treated as two gas penetrable parts in two separate chambers (4a and 4b) in said evaporator (4), wherein said parts are split into a plurality of parts (2$_r$) operated at different, successive temperature levels, said parts (2$_r$) of one of the chambers (4a or 4b) are intermittently heated by part flows of gas (10$_r$) in separate circuits propelled through said parts (2$_r$) and part heaters (66$_r$), simultaneously said flow of carrier gas (3') is propelled through the parts (2$_r$) of the other said chamber (4b or 4a) in succession, and further that said liquid flow (1') is propelled through said part heaters (10$_r$) in succession.

6. A method according to claim 1 wherein said mixture (2) is distributed in said evaporator (4) as layers (21), said volatile component being propelled in direct contact with said layers for counter current enthalpy exchange to a circulated further flow (9') of said carrier gas (3) along contact means (99), said further flow (9') being subsequently propelled through tubes (65) in heat transfer contact with said mixture layers (2,21) and subsequently being transferred back to contact said contact means (99).

7. A method according to claim 6 wherein said tubes are made of plastic membrane material, and are kept inflated against said layers (21) by means of a pressure difference between said flows (3',9') of said carrier gas (3).

8. A method according to claim 1 wherein said external heat source (7) and said heat sink (8) are provided by a heat pump.

9. A method according to claim 1 wherein before injection into the condenser said flow (3') of carrier gas (3) is precooled in a heat exchanger (63) and is cooled in and ejected out of said condenser (5).

* * * * *